UNITED STATES PATENT OFFICE.

HERBERT LEVINSTEIN AND JAMES BADDILEY, OF MANCHESTER, ENGLAND.

PRODUCTION OF FAST SHADES ON VEGETABLE FIBERS AND DYESTUFFS THEREFOR.

1,365,706.   Specification of Letters Patent.   Patented Jan. 18, 1921.

No Drawing.   Application filed February 14, 1916.   Serial No. 78,276.

*To all whom it may concern:*

Be it known that we, HERBERT LEVINSTEIN and JAMES BADDILEY, both subjects of the King of Great Britain and Ireland, and both residents of Blackley, Manchester, in the county of Lancaster, England, have invented new and useful Improvements in the Production of Fast Shades on Vegetable Fibers and Dyestuffs Therefor, of which the following is a specification.

This invention relates to the production of fast blue shades on vegetable fibers and dyestuffs therefor, and is a continuation in part of our earlier co-pending application filed 1st December 1914 under Serial No. 804117.

It has been shown in the specification of our prior British Letters Patent No. 27525 of 1912 that by coupling two molecules of resorcin with a tetrazo body comprising the following nucleus

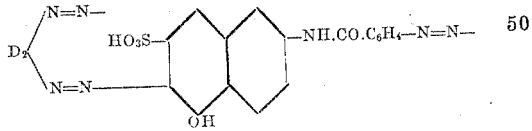

where D is a residue of the general constitution

Ar.CO.NH.Ar.

where Ar. represents an aryl radical, bright substantive orange, red, or brown dyestuffs are obtained, which, after dyeing, are fixed with formaldehyde on vegetable fiber. Shades faster to boiling soap than those produced by developed dyestuffs are thus obtained more conveniently than by methods involving the use of either developed or vat dyestuffs.

We have found on further investigation that other similarly fast shades may be obtained on vegetable fibers by other dyestuffs of analogous composition by similarly after treating the dyed shades with formaldehyde. The new dyestuffs are obtained by coupling two molecules of resorcin with tetrazo compounds comprising the following nucleus:

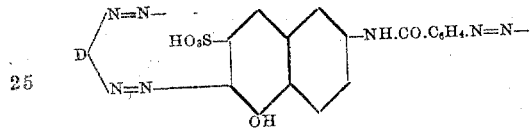

$D_2$ being a residue of the following constitution

—Ar—Ar—
—Ar—CH=CH—Ar—
—Ar—N=N—Ar
—Ar—N—N—Ar—
   \\ /
    O
—Ar—S—Ar—
—Ar—O—Ar—
—Ar—CS—Ar
—Ar—O—$CH_2$—$CH_2$—O—Ar—
—Ar—O—$C_6H_4$—O—Ar—

Ar indicating an aromatic radical.

*Example.*

228 parts of meta-azoxyanilin are tetrazotized in the usual way by means of 138 parts of sodium nitrite and the tetrazo-compound poured into a solution of 358 parts of meta-amino-benzoyl-2.amino.5.naphthol.7. sulfonic acid dissolved in a sufficient excess of sodium carbonate to keep the reaction mixture alkaline. When the intermediate product is formed it is rediazotized by acidifying the mixture and adding 69 parts of sodium nitrite, and the tetrazo-compound thus produced is poured into a solution of 220 parts of resorcin containing sufficient sodium carbonate to keep the reaction mixture alkaline. When the combination is completed the dyestuff is isolated in the usual way. In the form of its sodium salt it forms a dark powder, dissolving in water to an orange colored solution. When reacted upon by reducing agents it splits up into meta-azoxyanilin, meta-aminobenzoyl-2.amino.6.amino.5.naphthol.7-sulfonic acid and aminoresorcin. It probably has the constitution

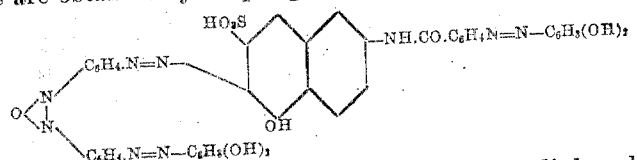

It dyes cotton directly in reddish orange shades which on aftertreatment with formaldehyde becomes fast to boiling soap.

Using diaminodiphenylether in place of the meta-azoxyanilin used above, a red dyestuff is obtained showing similar properties.

What we claim is:—

1. A process for producing substantive dyestuffs capable of being fixed on vegetable fibers by aftertreatment with formaldehyde which process consists in coupling two molecules of resorcin with tetrazo compounds comprising the following nucleus

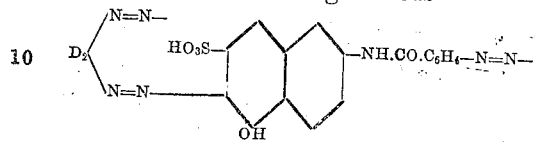

$D_2$ being the nucleus of a diamin containing at least two aryl nuclei, one of which is joined to each azo group attached to said nucleus.

2. A substantive dyestuff capable of being fixed on vegetable fibers by aftertreatment with formaldehyde produced by coupling two molecules of resorcin with tetrazo compounds comprising the following nucleus:

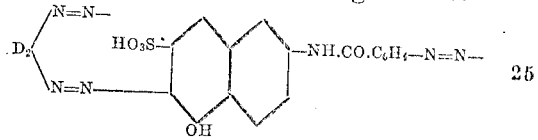

$D_2$ being the nucleus of a diamin containing at least two aryl nuclei, one of which is joined to each azo group attached to said nucleus.

In witness whereof we have hereunto set our hands.

HERBERT LEVINSTEIN.
JAMES BADDILEY.